United States Patent [19]
Pasternak et al.

[11] Patent Number: 6,045,288
[45] Date of Patent: Apr. 4, 2000

[54] ADJUSTABLE TELESCOPING UTILITY POLE

[75] Inventors: M. Randall Pasternak, 6903 W. Waunakee Cir., Mequon, Wis. 53092; Steven J. Benda, Cokato, Minn.

[73] Assignee: M. Randall Pasternak, Meguon, Wis.

[21] Appl. No.: 08/954,024

[22] Filed: Oct. 20, 1997

[51] Int. Cl.[7] ................................... F16B 2/04
[52] U.S. Cl. .................. 403/109.3; 403/104; 403/290; 294/19.2
[58] Field of Search .............. 403/109.1, 109.2, 403/109.3, 109.5, 109.8, 367, 368, 371, 377, 297, 104, 289, 290; 294/19.1, 19.2; 248/414

[56] References Cited

U.S. PATENT DOCUMENTS

| | | | |
|---|---|---|---|
| 1,852,785 | 4/1932 | Moehler | 403/109.3 |
| 1,919,114 | 7/1933 | Ley | 248/414 X |
| 2,549,257 | 4/1951 | Staunt | 294/19.2 |
| 2,947,040 | 8/1960 | Schultz | 403/290 X |
| 2,947,556 | 8/1960 | Wenger | 403/104 X |
| 2,973,214 | 2/1961 | Bates et al. | 403/290 |
| 3,265,346 | 8/1966 | Petrick | 403/104 X |
| 3,560,032 | 2/1971 | Cohen et al. | 403/104 |
| 4,650,145 | 3/1987 | Natzel et al. | 403/104 X |
| 4,947,607 | 8/1990 | Stein | 403/109.8 X |
| 5,312,089 | 5/1994 | Venegas, Jr. | 256/19 X |
| 5,370,368 | 12/1994 | Terrels et al. | 256/19 |
| 5,664,820 | 9/1997 | Carmien | 403/298 X |

FOREIGN PATENT DOCUMENTS

| | | | |
|---|---|---|---|
| 2408746 | 7/1979 | France | 403/104 |
| 2847101 | 5/1980 | Germany | 403/104 |

*Primary Examiner*—Harry C. Kim
*Attorney, Agent, or Firm*—Ryan Kromholz & Manion, S.C.

[57] ABSTRACT

An adjustable telescoping utility pole apparatus formed from a number of inter-received tubular members and frictional insert mechanisms. Each frictional insert mechanism has one end engaged with the inner diameter of the inner tubular member and a second end sidably engaged with the inner diameter of the outer tubular member.

17 Claims, 2 Drawing Sheets

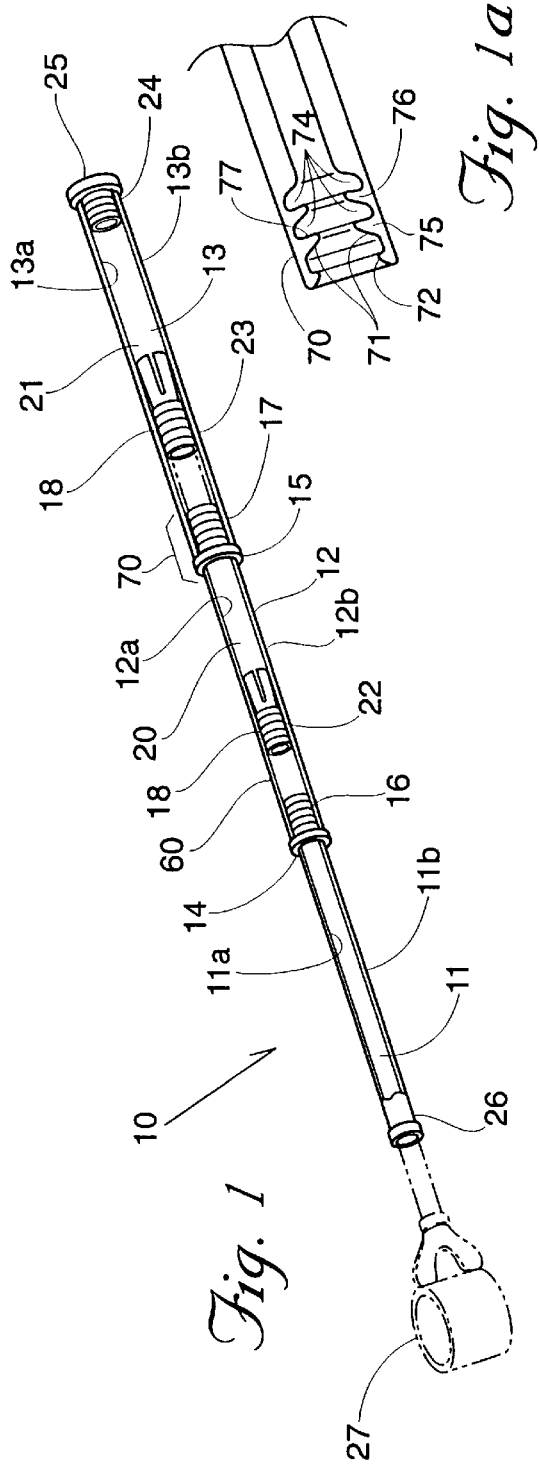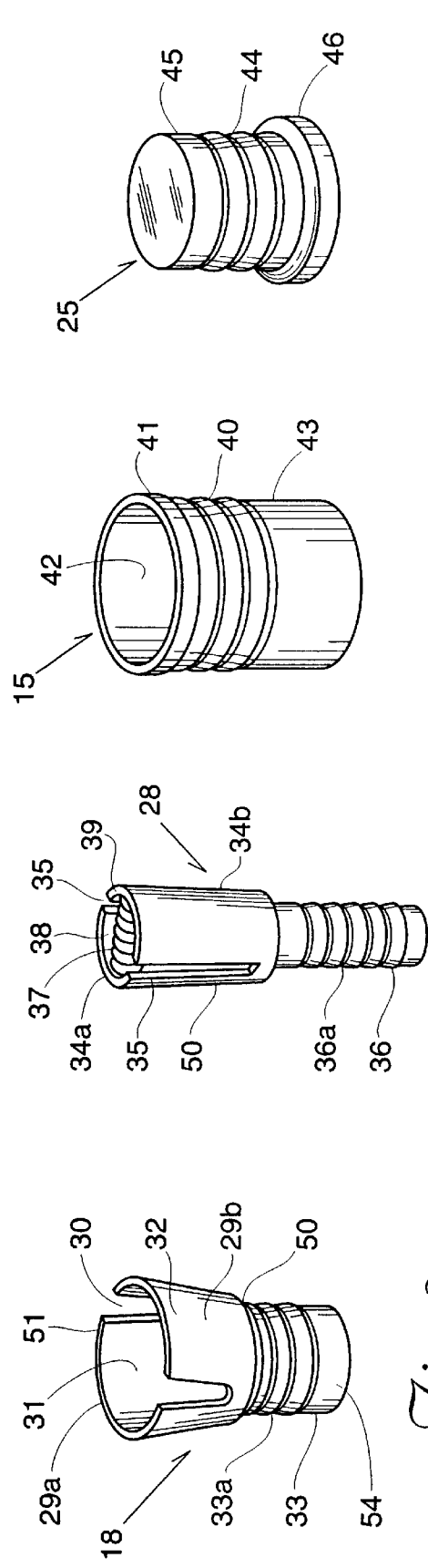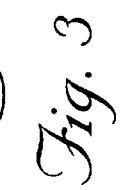

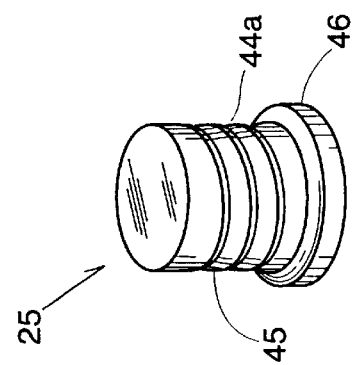
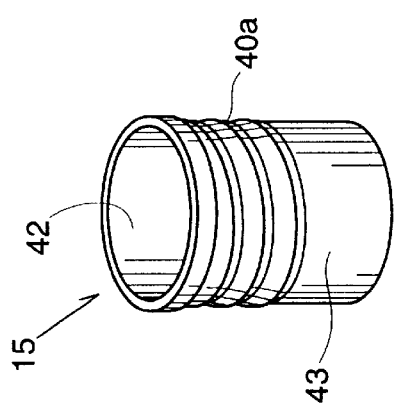
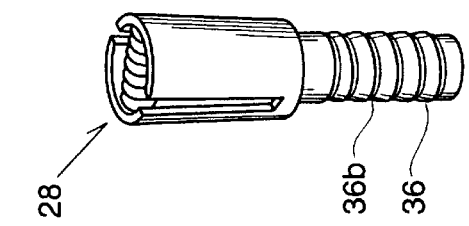
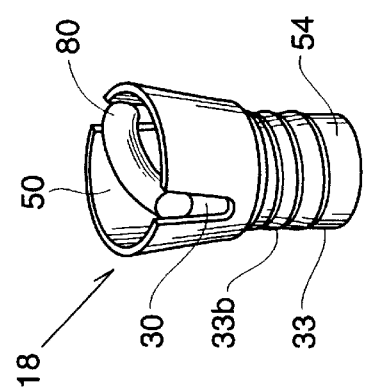
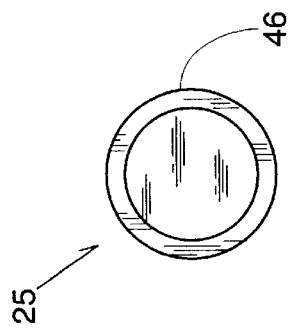
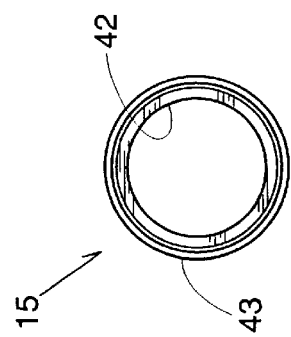
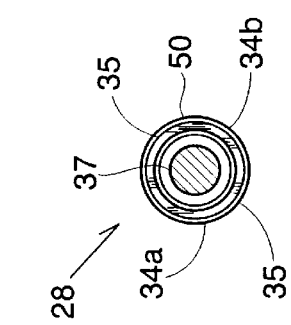
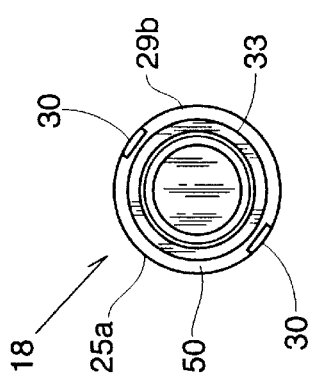

ADJUSTABLE TELESCOPING UTILITY POLE

BACKGROUND OF THE INVENTION

The present invention relates generally to an adjustable telescoping utility pole comprising a plurality of hollow tubular members and a novel apparatus to controllably and frictionally retain the tubular members in a predetermined position The pole has a variety of applications including an antenna, flag pole, and curtain rod. Additionally, the present invention can be utilized as a means of extending the reach and use of a variety of utility devices such as golf ball retrievers, light bulb retrievers, fishing poles and adjustable plant stakes. More particularly, this invention relates to novel apparatus for controlling the frictional force between the hollow inter-received tubular members that comprise the telescoping pole.

Telescoping poles are generally comprised of multiple hollow tubular sections that are slideably received within each other, thereby allowing the pole to be extended and retracted to various lengths. The extension range, and resulting length, of a telescoping pole is generally based upon the number and length of the individual tubular sections that make up the pole. A pole comprised of a greater number of sections of equivalent length will extend farther than a similar pole comprised of fewer sections of the same length. As such, the length of a fully extended telescoping pole may be increased by either increasing the length of the tubular sections, or by increasing the number of sections.

Each pair of tubular sections can be described as a receiving section and a received section. The received tubular section fits slideably within the receiving tubular section. The inner diameter of the receiving tubular section is sized equal to, or slightly larger than, the outer diameter of the internally received tubular section. This internally received tubular section may also be hollow itself and slideably receiving in another internal section which has an outer diameter sized in the same relationship as stated above. Because these sections all retract within each other, the tubular sections that make up a telescoping pole are generally all the same length. Collectively, this arrangement of internally positioning a number of tubular sections is used to create telescoping poles in a variety of lengths and diameters that are used in a variety of intermittently extended states. Typically, the length of extension and diameter of the tubular sections is dictated by the pole's application. Some telescoping poles are used for a specific purpose in an extended position and are stored in a retracted position when not in use. Other poles, such a telescoping pole that is in constant use, is extended from the retracted position to the extended position only once and then typically remains in the extended position.

To remain ridged and straight at an extended position, each individual section comprising the telescoping pole must remain partially within each neighboring section. Whether fully or partially extended, the tubular sections of the telescoping pole need to stay affixed in some manner to the adjoining sections so the pole will remain in place once positioned to a desired length. Existing mechanisms for slideably and affixedly securing a first tubular section to an adjoining tubular section include the use of a locking mechanism that locks the tubular sections when in a fully extended position, a locking mechanism that can be activated at any position by counter-rotating adjoining sections of the pole, or a rotating locking collar threadedly engaged to the outer tubular section. The effective useful positions of the first locking mechanism are normally limited to an either fully retracted or fully extended position. Because the second and third mechanisms require the user to physically rotate a tubular section or a collar in order to lock each pair of tubular sections together, these are generally limited to telescoping poles comprised of only a small number of tubular sections.

It is an object of the present invention to provide a telescoping pole that is continuously extendible while retaining the ability to be effectively secured in a continuum of positions along the complete extension range of the pole without the need to rotate adjoined sections or limit the pole to preset locking positions. It is a further object of the present invention to provide a telescoping pole having one or more novel frictional insert mechanisms which guide and frictionally affix an internally received tubular section to the interior surface of the receiving section. These and other objects of the invention will be readily apparent in the descriptions that follow.

SUMMARY OF THE INVENTION

The present invention relates generally to an adjustable telescoping utility pole comprising a plurality of hollow tubular members and a novel mechanism for applying a predetermined frictional force on the inner surface of each tubular member. More particularly, this invention relates to a novel apparatus for controlling the frictional force between the hollow inter-received tubular members. A number of collars and a plug are also utilized in the preferred embodiment for providing a bearing surface for the outer surface of the inner tubular member to slide upon and for capping the end of the last tubular member respectively.

The essence of the present invention is its novel frictional insert mechanism. The frictional insert mechanism comprises a base section and an engagement section. The base section is generally cylindrical in shape and includes an outer surface. One or more ribs are formed in the outer base surface. The diameter of the base section is substantially equal to or slightly greater than the diameter of the tubular member into which it fits. The ribs provide an interference fit so that the base section fits snugly within the end of a tubular member.

The engagement section is comprised of a second cylindrical section which is greater in diameter than the base section. One or more gaps or channels are formed within the engagement section such that the engagement section may be flared along its height. Accordingly, the diameter of the engagement section is greater at its outermost end when compared with its mid section or its juncture with the base section. In a preferred embodiment, one or more pieces of resilient or cloth-like material are adhered to the outer surface of the engagement member. The outer surface of the engagement section provides a frictional fit with the inner surface of the tubular member into which the frictional insert is placed. The flared section or sections act in a spring-like manner exerting a predetermined force upon the inner surface of the outer tubular member. Alternatively, the piece(s) of resilient material exert a predetermined force upon the inner surface of the outer tubular member.

The telescoping pole of my invention comprises three embodiments, all having a number of inter-received hollow tubular members. Each tubular member has a first and a second end. Each embodiment also includes a plurality of frictional insert mechanisms attached to the second ends of the tubular sections to provide a predetermined frictional fit between the members. In the preferred embodiment, one or more pieces of resilient or cloth-like material are adhered to the engagement section of the frictional insert mechanisms. Also on each embodiment, a collar is placed on the first end of each tubular member. The collar includes a bearing portion upon which the outer diameter of the inner tubular member may slide. Also in my preferred embodiment, a utility device, such as a golf ball retriever, is placed on the first end of the first tubular member and an end cap is placed on the second end of the last tubular member.

Another embodiment comprises the same inter-received tubular members with a friction insert mechanism attached to each second end; however, the material is not used. In yet another embodiment, a spring member is located within the inner diameter of the engagement section. The spring applies a predetermined pressure or frictional force to the engagement section which in turn applies the force to the interior surface of the receiving tubular member. While the third embodiment utilizes the same inner-received tubular sections, the coiled spring member within the friction insert mechanism provides a means to controllably increase the frictional force between the tubular sections. Accordingly, this embodiment is preferred when a high resistance to elongation or collapse of the tubular member is required.

DESCRIPTION OF THE DRAWINGS

FIG. 1 is a perspective view of the adjustable telescoping pole, showing a number of tubular sections, frictional insert mechanisms, collar bearing sleeves, a plug, and golf ball retrieving device (shown in phantom).

FIG. 1A is an expanded sectional view of end section 70 of the tubular sections of the telescoping pole showing the internal structure of the end section 70.

FIG. 2 is a perspective view of the first embodiment of the frictional insert mechanism.

FIG. 2a is a perspective view of an alternative embodiment of the first embodiment of the frictional insert mechanism.

FIG. 3 is a perspective view of the second embodiment of the frictional insert mechanism including a separate spring.

FIG. 3a is a perspective view of an alternative embodiment of the second embodiment of the frictional insert mechanism including a separate spring.

FIG. 4 is a perspective view of the collar bearing sleeve.

FIG. 4a is a perspective view of an alternative embodiment of the collar bearing sleeve.

FIG. 5 is a perspective view of the end plug.

FIG. 5a is a perspective view of an alternative embodiment of the end plug.

FIG. 6 is a bottom plan view of the first embodiment of the frictional insert mechanism.

FIG. 7 is a bottom plan view of the second embodiment of the frictional insert mechanism.

FIG. 8 is a bottom plan view of the collar bearing sleeve.

FIG. 9 is a bottom plan view of the end plug.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims. With reference to FIG. 1, it will be noted that the adjustable multi-function telescoping pole 10 of this invention comprises a plurality of hollow tubular sections 11, 12 and 13, each having corresponding interior surfaces 11A, 12A and 13A and corresponding exterior surfaces 11B, 12B and 13B. While only three (3) tubular members are shown, it is to be understood that any number could be utilized. With continued reference to FIG. 1, the telescoping pole 10 is further characterized by having bushings or sleeves 14 and 15 fitted within the forward or first ends 16 and 17 of tubular sections 12 and 13. Shown also in FIG. 1 are frictional insert mechanisms 18 positioned within the interior regions 20 and 21 of tubular sections 12 and 13, respectively. Frictional insert mechanisms 18 are affixed to the rear or second ends 22 and 23 of tubular sections 11 and 12, respectively. Inserted into the rear end 24 of tubular section 13 is a plug cap 25. At the front end 26 of tubular section 11 an exemplary utility device 27, such as a golf ball retriever, is shown in phantom.

Referring to FIG. 1A, it will be observed that. Each first end 16, 17 includes, in its preferred form, a section 70 in which the interior of the tubular section includes an annular bead 72 and a series of channels 74 defined by thread structures 75. Thread structures 75 include inwardly sloped sides 71 and perpendicular sides 77. Thread structures 75 define channels 74. Preferably, portion 76 of each thread structure 75 is substantially flat. The channels 74 are maintained in predetermined positions for engagement with ribs 33 (described below). The channels 74 may also be single helical or spiral channel for engagement with rib 33B (described below).

Additionally, it should be noted that the channel structure described above may also be applied to the opposite end of each tube section as well so that there are channels 74 also on the interior surface of the opposite end of each tube section for engagement with ribs 36, ribs 36A, ribs 44, and ribs 44a (described below). Presently, it is believed commercially preferable to use this structure.

Shown in detail in FIGS. 2 and 6 is the first embodiment of the frictional insert mechanism 18. The mechanism 18 comprises a flared cupped section 50 and a base section 33. In the preferred embodiment shown, flared cupped section 50 includes two frictional engagement members 29A and 29B. The engagement members 29A and 29B define a pair of gaps 30. As depicted in FIG. 2, the engagement members 29A and 29B are flared outward. Accordingly, the separation distance between the members 29A and 29B is greatest at their upper edge 51. Each member 29A and 29B has a corresponding interior surface 31 and an exterior surface 32.

Beneath flared cupped section 50 is a shaft base section 33 including an outer periphery 54. Axially or longitudinally spaced ribs 33A are formed in the outer periphery 54 of base section 33. The embodiment of the frictional insert mechanism shown in FIG. 2a is identical to FIG. 2 with the exception of the base section 33. The base section 33 of the alternative (FIG. 2a) embodiment includes a helical or spiral rib 33B formed in the base section 33.

Referring to FIG. 2a a further refinement of the present invention may be seen. Rubber tubing 80 is inserted into gaps 30. The rubber tubing 80 is an elastic material which, engaged with the gaps 30, causes an expansive pressure on the gaps and ensuring positive [pressure will be applied in a manner similar to the spring action disclosed in the alternative embodiments of FIGS. 3 and 3a. The use of the rubber tubing 80 is presently preferred since the plastic material from which the frictional insert 18 is presently made has a tendency to lose its shape or memory of its shape thereby becoming an undesirably loose fitting over time.

Shown in FIGS. 3 and 7 is a second embodiment of the friction insert mechanism 28. Similar to embodiment 18, frictional insert mechanism 28 also has a flared cupped section 50 including a pair of engagement members 34A and 34B that define a pair of gaps 35 there between. The mechanism 28 also has a base section 36 further including axially or longitudinally spaced ribs 36A. Second embodiment 28 includes a coil spring 37 located between the interior surfaces 38 and 39 of engagement members 34A and 34B. While a coil spring 37 is shown, it should be understood that other types of springs could be used in the same manner. Like the embodiment shown in FIG. 2a, the embodiment shown in FIG. 3a includes a spiral or helical rib 36B formed in base 36.

Now referring to FIGS. 4, 4a and 8, there is shown in detail the bushing or sleeve 14, 15. The bushing 14, 15 includes an interior bearing surface 42, an exterior surface 43, and a top lip 41. Interior bearing surface 42 is sized to slideably receive the tubular member 11, 12 or 13 that is positioned to retract into the tubular member to which bushing 14, 15 is installed. As shown in FIG. 4, exterior surface 43 includes axially or longitudinally spaced ribs 40. The diameter of top lip 41 is substantially equivalent to the diameter of the tubular member into which the bushing 14, 15 is positioned. FIG. 4a shows an alternative embodiment wherein the outer surface 43 has a spiral or helical rib 40A formed therein.

FIGS. 5, 5a and 9 show the end plug 25 in detail. The plug is placed in the second or outer end 24 of the largest diameter tubular member 13. As indicated for the bearing sleeve 15, the end plug 25 may have axially or longitudinally spaced ribs 44 or a spiral rib 44A formed along outer surface 45. The end plug 25 also has a lip 46 whose diameter is substantially equal to the diameter of the second or outer end 24 of the largest diameter tubular member 13.

The base section 33 of the frictional insert mechanism 18 is sized to substantially the same diameter as the inner diameter 11B of a tubular section 11 and is affixed within the end 22 of the tubular section 11 by means of an interference fit. The bushing 14 is similarly affixed within the forward or first end 16 of the receiving tubular section 12. One of the functions of the bushing 14 is to prevent the frictional insert mechanism 18 from being completely removed from end 16 of the tubular member 12. The interference fit between the frictional insert mechanism 18 and a tubular member 12 or 13 and the bushing 14 and tubular member 11 can be increased by forming grooves within the interior of the ends of the tubular members. These grooves may be either longitudinally-spaced as shown in FIGS. 2, 3, 4, and 5, inclusive, or spirally arranged as shown in the views of FIGS. 2a–5a, inclusive.

The flared exterior surfaces 32 of each engagement member 29A & 29B of the frictional insert mechanism 18 contact the interior surface 12A of the receiving tubular section 12 and exert a force thereon. The force results from the flared shape of the cupped section 50. The force to be exerted upon the inner surface of each tubular member can be increased with the addition of the spring 37 within the cupped section 50.

At the end 24 of tubular section 13, the base section 24 of the end cap 25 is affixed within the interior surface 13A of tubular member 13. At the opposite end 26, a utility device 27, such as a golf ball retriever, is inserted into the first end 26 of tubular member 11.

While FIG. 1 shows three intermittently sized tubular sections 11, 12, & 13 as making up the telescoping pole 10, it is possible that any variety of sizes and lengths may be used in the same manner to create a telescoping pole of varying lengths and diameters.

The preferred construction material of the hollow tubular sections 11, 12 & 13 is aluminum or rigid plastic. The preferred construction material of the frictional insert mechanisms 18, collar sleeves 14, 15 and plug 25 is also plastic. However, it is to be understood that a variety of materials may be used to accomplish the same desired function.

Finally, it is preferred that a plastic sheath 60, shown in FIG. 1, be applied over the outside diameter of each tubular section 11–13. The sheath 60 should have a first end which aborts the cupped section 50 of the frictional insert mechanism 18 (or alternative embodiments thereof). The sheath 60 then should extend a predetermined distance up the tubular section (e.g. $1/60_{th}$ the length of the tubular section). Preferably, the sheath 60 will have a thickness of approximately .015 inches. Accordingly, the sheath 60 will limit the action on each tubular section since, upon extension, the sheath 60 will engage the bushing 15. Because the sheath 60 is very thin it will not engage the inside surfaces of the tubular section in which it is located. By limiting the degree to which each tubular section 11–13 may be extended the overall strength of the pole 10 is enhanced and unintentional disassembly is more readily prevented.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A telescoping apparatus for attachment to a utility device, the apparatus comprising:
    at least two hollow tubular members sized to fit one within the other, wherein one of said hollow tubular members has an outer surface diameter less than an inner surface diameter of the other hollow tubular member;
    a friction insert mechanism comprising a cup-like section having an upper rim with two opposed slits formed thereon to form a pair of frictional engagement members for slidable frictional engagement with an inner surface of the other hollow tubular member, said cup-like section further having a transversely disposed coil spring located within the cup-like section and directly engaging and outwardly biasing the frictional engagement members; and
    said friction insert mechanism further including an integrally formed, longitudinally extending base section, said base section having an outer periphery; said outer periphery being sized to fit within said one hollow tubular member and including a continuous radially projecting rib engageable with an inner surface of said one hollow tubular member.

2. The apparatus of claim 1 further comprising at least one bushing having a base portion terminating in a radially extending lip portion and a continuous radially projecting rib extending from said base portion for attaching to an end of the other hollow tubular member.

3. The apparatus of claim 2 wherein said base section includes a plurality of said continuous radially projecting ribs.

4. The apparatus of claim 1 wherein said inner surface of said one hollow tubular member includes an end section having a threaded interior surface.

5. The apparatus of claim 4 wherein said continuous radially projecting rib is configured to provide a helically formed thread engageable with said threaded interior surface.

6. The apparatus of claim 1 wherein said frictional engagement members are oppositely disposed and said slits begin at a top edge of the rim and extend toward said base section.

7. The apparatus of claim 6 wherein said slitted cup-like section tapers outwardly to provide an interference fit between said rim and said inner surface of said other hollow tubular member.

8. The apparatus of claim 1 wherein at least one of said hollow tubular members has an exterior surface and a predetermined length; said tubular member having a sheath engaged with said exterior surface and extending a predetermined distance over said predetermined length.

9. The apparatus of claim 1 wherein said spring disposed in the cup-like section provides independent biasing thereof for increased frictional engagement with the inner surface of the other hollow tubular member.

10. The apparatus of claim 9 wherein said spring comprises a coiled compression spring.

11. The apparatus of claim 1 further comprising a plug cap, said plug cap being attached to and enclosing an end of said other hollow tubular member.

12. The apparatus of claim 1 wherein said friction insert mechanism includes a plurality of longitudinally spaced, continuous radially projecting ribs.

13. A frictional insert mechanism for providing a slidable fit between a pair of interfitting hollow tubular members, wherein one of said hollow tubular members has an outer surface diameter less than an inner surface diameter of the other hollow tubular member, said frictional insert mechanism comprising:

a cup-like section having an upper rim with two opposed slits formed thereon to form a pair of frictional engagement members for slidable frictional engagement with an inner surface of said other hollow tubular member, said cup-like section further having a transversely disposed coil spring located within the cup-like section and directly engaging and outwardly biasing the frictional engagement members; and said frictional insert mechanism further including an integrally formed, longitudinally extending base section, said base section having an outer periphery; said outer periphery being sized to fit within said one hollow tubular member and including a continuous radially projecting rib engageable with an inner surface of said one hollow tubular member.

14. The frictional insert mechanism of claim 13 wherein the spring is located in the proximity of the outer periphery to provide independent outwardly biasing for said cup-like section.

15. The frictional insert mechanism of claim 13 wherein said slitted cup-like section tapers outwardly to provide an interference fit between said rim and said inner surface of said other hollow tubular member.

16. The frictional insert mechanism of claim 13 further comprising a plug cap, said plug cap being attachable to and for enclosing an end of said other hollow tubular member.

17. The frictional insert mechanism of claim 13 wherein said continuous radially projecting rib is configured to provide a helically formed thread.

* * * * *